United States Patent
Wang

(10) Patent No.: US 12,534,384 B2
(45) Date of Patent: Jan. 27, 2026

(54) COBALT SULFIDE/REDUCED GRAPHITE OXIDE COMPOSITE AND APPLICATION THEREOF IN GAS SENSORS

(71) Applicant: SOOCHOW UNIVERSITY, Suzhou (CN)

(72) Inventor: Yanyan Wang, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 18/037,559

(22) PCT Filed: Jun. 29, 2022

(86) PCT No.: PCT/CN2022/102416
§ 371 (c)(1),
(2) Date: May 17, 2023

(87) PCT Pub. No.: WO2023/193356
PCT Pub. Date: Oct. 12, 2023

(65) Prior Publication Data
US 2024/0360000 A1     Oct. 31, 2024

(30) Foreign Application Priority Data

Apr. 7, 2022   (CN) .......................... 202210362201.0

(51) Int. Cl.
*H01B 1/10*       (2006.01)
*C01B 32/225*   (2017.01)
(Continued)

(52) U.S. Cl.
CPC ............ *C01G 51/15* (2025.01); *C01B 32/225* (2017.08); *C01B 32/23* (2017.08); *C01G 51/04* (2013.01);
(Continued)

(58) Field of Classification Search
CPC .... H01B 1/00; H01B 1/04; H01B 1/10; C01B 32/23; C01G 51/04
See application file for complete search history.

(56) References Cited

U.S. PATENT DOCUMENTS

2019/0194556 A1     6/2019   Safaei Mahmoudabadi et al.

FOREIGN PATENT DOCUMENTS

| CN | 106207172 A | 12/2016 |
| CN | 109852344 A | 6/2019 |

(Continued)

OTHER PUBLICATIONS

Online AzoNano article entitled "Differences Between Graphene and Graphite" May 7, 2014 Downloaded from https://www.azonano.com/article.aspx?ArticleID=3836 (Year: 2014).*

(Continued)

*Primary Examiner* — Mark Kopec
(74) *Attorney, Agent, or Firm* — SZDC Law PC

(57) ABSTRACT

A method for preparing a cobalt sulfide/reduced graphite oxide composite includes: preparing a glycerol-cobalt precursor by taking a water-soluble cobalt salt, a micromolecular alcohol solvent, and glycerol as raw materials; mixing the glycerol-cobalt precursor with an alkali liquor to prepare a $Co(OH)_2$ nanoflower; calcining the $Co(OH)_2$ nanoflower to obtain a $Co_3O_4$ nanoflower; subjecting the $Co_3O_4$ nanoflower to a reaction with a water-soluble sulfur salt to obtain a COS nanoflower, and mixing the COS nanoflower with graphite oxide and carrying out a heat treatment to obtain the composite. The response characteristics of a gas sensor to $NO_2$ gas are studied at room temperature, and the graphite is complexed with a transition metal sulfide with unique morphology to construct a unique heterostructure. While expanding the specific surface area to increase the number of (Continued)

adsorption sites, the heterostructure of a contact surface is used to greatly enhance the charge-transfer efficiency.

3 Claims, 3 Drawing Sheets

(51) Int. Cl.
    *C01B 32/23* (2017.01)
    *C01G 51/04* (2025.01)
    *C01G 51/15* (2025.01)
    *G01N 27/30* (2006.01)

(52) U.S. Cl.
    CPC .............. *G01N 27/30* (2013.01); *H01B 1/10* (2013.01); *C01P 2004/03* (2013.01); *C01P 2004/80* (2013.01)

(56) References Cited

FOREIGN PATENT DOCUMENTS

| | | | |
|---|---|---|---|
| CN | 113552179 A | | 10/2021 |
| CN | 113607783 A | | 11/2021 |
| CN | 114604903 A | | 6/2022 |
| CN | 116453867 A | * | 7/2023 ............. H01G 11/22 |

OTHER PUBLICATIONS

EPO machine-generated translation of CN109852344A, patent published Jun. 7, 2019 (Year: 2019).*
Jiang et al., "Introducing graphite nanosheets to change the microscopic morphology of CoS nanoparticles to obtain ultra-thin and excellent electromagnetic wave absorption performance," Diamond & Related Materials 124 (2022) 108913 Available online Feb. 14, 2022 (Year: 2022).*
Zhao et al. "Self-Assembled CoS Nanoflowers Wrapped in Reduced Graphene Oxides as the High-Performance Anode Materials for Sodium-Ion Batteries," Chem. Eur. J. 2017, 23, 13150-13157 (Year: 2017).*
English language translation of form PCT/ISA/237 (mailed Dec. 15, 2022).*
Feng et al "Self-assembly of cobalt sulfide nanosheets into nanoflowers and ordered nanosheets arrays for dye-sensitized solar cells", Electrochimica Acta 301 (2019) 220-228.*
Zhang et al "Synthesis of 3D flower-like cobalt sulfide hierarchitecture for high-performance electrochemical energy storage", J Nanopart Res (2017) 19: 202 DOI 10.1007/s11051-017-3905-8.*
Zhao et al "Self-Assembled CoS Nanoflowers Wrapped in Reduced Graphene Oxides as the High-Performance Anode Materials for Sodium-Ion Batteries", Chem. Eur. J. 2017, 23, 13150-13157.*
Tronganh et al "Hierarchically assembled 3D nanoflowers and 0D nanoparticles of nickel sulfides on reduced graphene oxide with excellent lithium storage performances", Applied Surface Science 439 (2018) 386-393.*

* cited by examiner

COBALT SULFIDE/REDUCED GRAPHITE OXIDE COMPOSITE AND APPLICATION THEREOF IN GAS SENSORS

This application is the National Stage Application of PCT/CN2022/102416, filed on Jun. 29, 2022, which claims priority to Chinese Patent Application No. 202210362201.0, filed on Apr. 7, 2022, which is incorporated by reference for all purposes as if fully set forth herein.

TECHNICAL FIELD

The present invention belongs to gas sensing technology, specifically relating to a cobalt sulfide/reduced graphite oxide composite and thereof application in gas sensors.

BACKGROUND OF INVENTION

With the rapid development of the social economy and the continuous improvement of industrialization level, environmental pollution has become an increasingly serious problem. In many countries, the combustion of fossil fuels and the large production of automobile exhaust can lead to the emission of harmful gases such as nitrogen oxides, disturbing the environmental balance. Therefore, the detection of nitrogen oxides, especially $NO_2$, has attracted considerable interest. It poses great harm to human health and the environment, and it not only does harm to the respiratory systems of humans, animals, and plants, but also causes the formation of acid rain. Therefore, the research and development of high-performance $NO_2$ gas sensors and the implementation of real-time, fast, and accurate monitoring of toxic and harmful gases at room temperature have become current research focus. It is of great social significance to develop highly sensitive sensors to monitor these gases and prevent their harm to human health and the environment.

Gas sensors are a detection device that converts gas-related information into electrical information and they have been applied in many fields, such as industrial production, medical diagnosis, environmental protection, etc, which makes the topic of improving the performance of gas sensors the most important issue for researchers, while the quality of sensing materials determines the performance of gas sensors. Currently, various nanomaterials such as metal oxides, metal sulfides, and polymers are used as gas sensing materials. As the demand for gas detection has been increased with the development of various fields, the development of high-performance gas sensors has become a research focus. Gas sensing material is the core of sensors, and it directly affect the performance of gas sensors. Graphite has become one of the ideal candidates for gas sensing materials due to its high specific surface area and excellent carrier mobility. However, gas sensors constructed by graphite thin films have issues of low sensitivity and slow adsorption/desorption. Transition metal sulfide is a strong competitor for gas sensing material in the field of gas sensors. However, when combined with other materials, the transition metal sulfide can form heterojunctions at the interface of the material and cause the migration of carriers, resulting in changes in the conductivity of the composite material and affecting its gas sensing property.

Technical Problems

The present invention used a hydrothermal process to prepare the glycerol cobalt precursor, then prepared cobalt hydroxide nanoflowers under the alkaline condition, then prepared tricobalt tetraoxide nanoflowers through high-temperature annealing, and then prepared CoS nanoflowers through ion exchange reaction; the improved Hummers method was applied to prepare GO, and CoS/GO composite materials with different mass ratios were prepared by magnetic stirring; and CoS/rGO composite materials were prepared by high-temperature annealing under 200° C., and a CoS/rGO composite gas sensor was prepared accordingly. The response characteristics of the sensor to $NO_2$ gas were studies at room temperature.

Technical Solution

The present invention adopted the following technical solution: a cobalt sulfide/reduced graphite oxide composite comprises CoS nanoflowers and graphite covered on CoS nanoflowers; preferably, graphite is reduced graphite oxide.

The present invention disclosed the application of the above-mentioned cobalt sulfide/reduced graphite oxide composite in the preparation of gas sensors or gas detection; the gas is a nitrogen oxide gas, such as nitrogen dioxide.

The present invention disclosed a preparation method for the above-mentioned cobalt sulfide/reduced graphite oxide composite. The CoS nanoflowers were mixed with graphite oxide for heat treatment to obtain a cobalt sulfide/reduced graphite oxide composite; preferably, the CoS nanoflower dispersion was mixed with the graphite oxide dispersion and subjected to centrifugation treatment and the obtained precipitate was then heat treated at 150-250° C. for 60-120 minutes to obtain a cobalt sulfide/reduced graphite oxide composite; further preferably, it was heat treated at 180-220° C. for 80-100 minutes. Preferably, the mass ratio of CoS nanoflowers to graphite oxide is 0.2-20:1, preferably 2-10:1, and further preferably 4-6:1. Preferably, the mixing time for CoS nanoflower dispersion and graphite oxide dispersion is 1-5 hours, preferably 2-4 hours.

In the present invention, the water-soluble cobalt salt, small molecule alcohol solvent, and glycerin are used as raw materials to prepare the glycerol cobalt precursor; then the glycerol cobalt precursor ix mixed with alkaline solution to prepare $Co(OH)_2$ nanoflowers; then the $Co(OH)_2$ nanoflowers are calcined to obtain the $Co_3O_4$ nanoflowers; after that, the $Co_3O_4$ nanoflowers are reacted with a water-soluble sulfur salt to obtain CoS nanoflowers. Preferably, during the preparation of glycerol cobalt precursor, the reaction temperature is 140-180° C. and the time is 3-8 hours. The preferred reaction temperature is 150-170° C. and the time is 5-7 hours; the glycerol cobalt precursor dispersion is mixed with the alkaline solution for centrifugal treatment and the collected precipitate was dried to prepare $Co(OH)_2$ nanoflowers; the calcination process is to raise the temperature from room temperature to 300-400° C. at a rate of 3-10° C./min and maintain it for 15-45 minutes. Preferably, the temperature is raised from room temperature to 320-380° C. at a rate of 4-7° C./min and maintain it for 25-40 minutes.

The present invention disclosed a gas sensor, comprising a conductive base, an interdigital electrode, and a gas sensitive material on the surface of the interdigital electrode. The gas sensitive material is a cobalt sulfide/reduced graphite oxide composite as described above; The interdigital electrode is a silicon metal interdigital electrode with a spacing of 5-20 μm, preferably 10 μm. Specifically, the interdigital electrode is fixed on the conductive base, and then drop casted with the cobalt sulfide/reduced graphite oxide composite solution to be dried to obtain the gas sensor.

The present invention disclosed a method for detecting nitrogen oxides in an environment, wherein the gas sensor is placed in the environment to be detected to complete the detection of nitrogen oxides in the environment; preferably, the nitrogen oxide is nitrogen dioxide.

Transition metal sulfide has a large specific surface area and good carrier mobility at room temperature, ensuring the good conductivity at room temperature as well, so the transition metal sulfide is a strong competitor for gas sensing material in the field of gas sensors. However, when combined with other materials, the transition metal sulfide can form heterojunctions at the interface of the material and cause the migration of carriers, resulting in changes in the conductivity of the composite material and affecting its gas sensing property.

Beneficial Effects

The present invention proposed a multi-level heterostructure of nanoflowers/nanosheets based on cobalt sulfide (CoS)/reduced graphite oxide (rGO) composite, which exhibits excellent response performance to nitrogen dioxide ($NO_2$) gas. The heterostructure of CoS nanoflower/rGO nanosheet composite is constructed with the hydrothermal method combined with ion exchange reaction. The composition of graphite with transition metal sulfides is an effective way to improve the sensing performance of materials. Due to its excellent physical, chemical, and electronic properties, it can be well applied as a sensing material in the field of sensors. The p-p heterostructure of the composite materials has excellent electron donor and acceptor capabilities, which can improve response and reduce operating temperature; and the composition of the two materials can effectively prevent the stacking and aggregation of graphite sheets, increase the contact area between the material and gas, provide more adsorption sites, effectively improve electron transfer and enhance gas sensing performance, so it demonstrates good research prospects.

EXAMPLES OF THE PRESENT INVENTION

Figure 1:
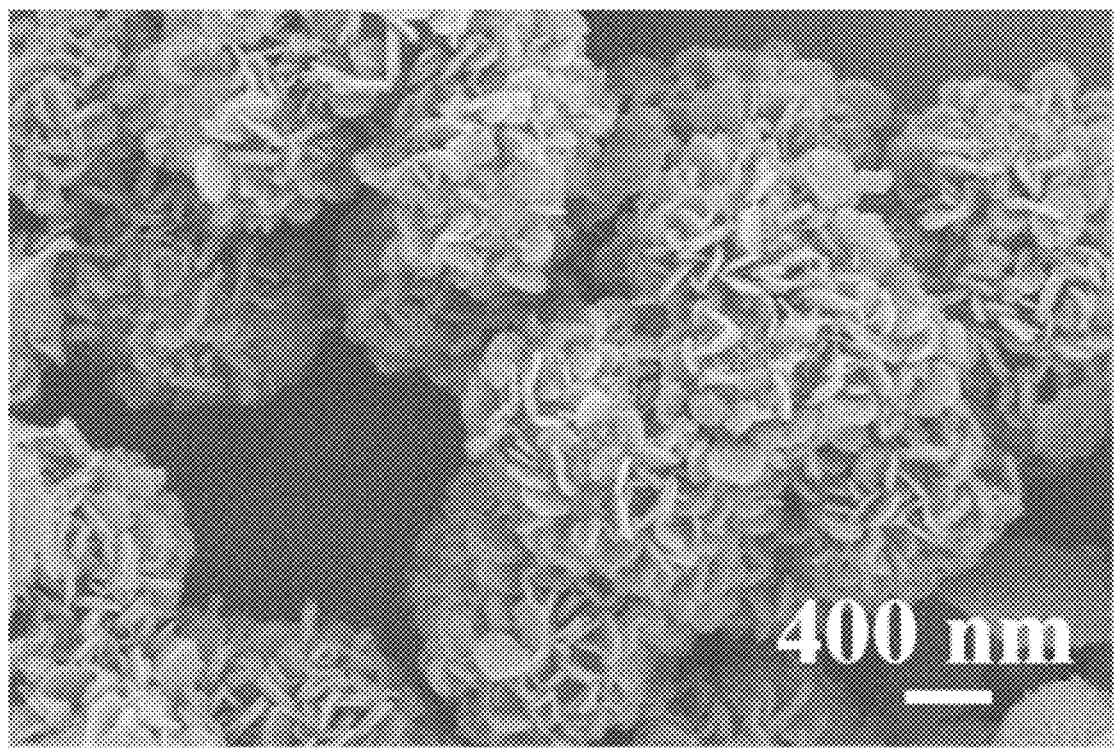
FIG. 1 shows the SEM pattern of CoS nanoflowers.

Graphite is a strong candidate for sensing materials due to its large specific surface area. However, in the prior art, gas sensors constructed with graphite sheet films have issues of low sensitivity and slow adsorption/desorption; the construction of graphite heterostructure in the present invention is an effective way to improve its performance. Transition metal sulfide has a unique stratified structure and good conductivity at room temperature, making it a research focus in gas sensing materials; the nanocomposite materials can not only compensate for the defect of the single material, but also provide more adsorption sites for gas adsorption, improving sensing performance. The rational design of the micro-nano structure is the key and challenge for high-performance gas sensors of the graphite heterostructure. The present invention combines graphite with transition metal sulfide of unique morphology to construct a unique heterostructure to increase the specific surface area and increase adsorption sites, and the heterostructure of the contact surface is utilized to significantly enhance charge transfer efficiency, thereby effectively improving gas sensitivity.

The raw materials of the present invention are all existing available products, and the specific preparation and testing methods are existing conventional methods.

Example 1 Preparation of Glycerol Cobalt Precursor

The glycerol cobalt precursor was prepared by hydrothermal synthesis under closed high-temperature conditions. The specific preparation process is as follows:

(1) 0.291 g of cobalt nitrate hexahydrate was weighed and placed in a beaker. 23 ml of isopropyl alcohol and 4 ml of glycerin were added to the beaker with a graduated cylinder respectively, and stirred magnetically at room temperature for 30 minutes to form a red transparent mixed solution.

(2) The mixed solution was transferred to a 50 ml reactor and placed in an oven to react at 160° C. for 6 hours.

(3) After the reaction, the solution was naturally cooled to room temperature. The supernatant was sucked away with a dropper, and then the solution was collected by centrifugation, washed several times with anhydrous ethanol, and dried in an oven at 60° C. for 2 hours for later use.

Example 2 Preparation of Tricobalt Tetraoxide Nanoflowers

The glycerol cobalt precursor in Example 1 reacted under alkaline conditions to form cobalt hydroxide nanoflowers, which were further annealed at high temperature to obtain tricobalt tetraoxide nanoflowers. The specific preparation process is as follows.

(1) 0.5 g of NaOH solid was weighed and dissolved in 50 ml of deionized water, and 0.25M of NaOH aqueous solution was prepared and stirred magnetically at room temperature for 30 minutes.

(2) 0.1 g of glycerol cobalt precursor was weighed and dissolved in 5 ml of deionized water, ultrasonically dispersed for 10 minutes to obtain a uniform suspension.

(3) The two solutions from (1) and (2) were mixed and magnetically stirred at room temperature for 30 minutes, and the products after reaction were centrifugally collected and washed several times with anhydrous ethanol, and dried in an oven under 60° C. for 10 hours to obtain $Co(OH)_2$ nanoflowers.

(4) 0.1 g of $Co(OH)_2$ powder was weighed and placed in a clean quartz boat. And the quartz boat was placed in a tube furnace (air) and the temperature was raised to 350° C. at a rate of 5° C./min for 30 minutes, and the powder changed from brownish green to black to obtain $Co_3O_4$ nanoflowers.

Example 3 Preparation of Cobalt Sulfide (CoS) Nanoflowers

Cobalt sulfide nanoflowers were prepared through ion exchange reaction. 1.2 g of sodium sulfide nonahydrate was weighed and dissolved in 50 ml of deionized water and magnetically stirred for 30 minutes to form a uniform solution of sodium sulfide nonahydrate with a concentration of 0.1 M; 0.1 g of Co₃O₄ nanoflowers prepared in the Example 2 was weighed and added to the above solution for ultrasonic dispersion for 10 minutes; and the mixed solution was transferred to a 100 ml reactor and placed in an oven to react at 160° C. for 8 hours; after the reaction, the solution was naturally cooled to room temperature, the reaction products were collected by centrifugation, washed several times with deionized water, and dried in an oven at 60° C. for 3 hours to prepare CoS nanoflowers. FIG. 1 shows the SEM pattern of CoS nanoflowers.

Example 4 Preparation of CoS/rGO Composite Material

The graphite oxide of the present invention was prepared by the optimized Hummers method. The general principle is to use strong acid and strong oxidant to make oxidization intercalation of natural graphite flakes to increase the interlayer spacing of graphite flakes, and then use thermal expansion method to further increase the interlayer spacing. During the process of increasing the interlayer spacing, mechanical stirring and ultrasonic peeling are carried out to separate the graphite flakes to finally prepare the graphite oxide (GO), and the preparation process is as follows.

1) 2 g of natural graphite (500 mesh) was weighed and mixed with 50 ml of concentrated sulfuric acid in a 250 ml beaker, and stirred regularly for 30 minutes, and the concentrated sulfuric acid was used as an intercalator and solvent to complete the preliminary oxidation intercalation.
2) 1 g of sodium nitrate was added to the reaction solution to generate nitric acid in situ and stirred regularly for 2 hours in an ice bath to prevent rapid oxidation from affecting intercalation.
3) 7.3 g of potassium permanganate was added in three batches to the mixed solution and stirred in a 35° C. water bath for 2 hours to further complete the oxidation intercalation.
4) 150 ml of deionized water was added to the mixed solution and stirred for 30 minutes for heat release. The thermal expansion was used to further increase the interlayer spacing. Then 55 ml of 4% hydrogen peroxide solution was added dropwise to the mixed solution and stirred for 30 minutes to further oxidize and consume excessive potassium permanganate. After stirring, a brownish yellow GO suspension was obtained.
5) The brownish yellow supernatant solution was filtered and washed three times with dilute hydrochloric acid (3%, 100 ml), centrifuged three times, then dissolved in deionized water and dialyzed in a dialysis bag for one week. After dialysis, it was dried in an oven at 40° C. to obtain graphite oxide.

Figure 2:
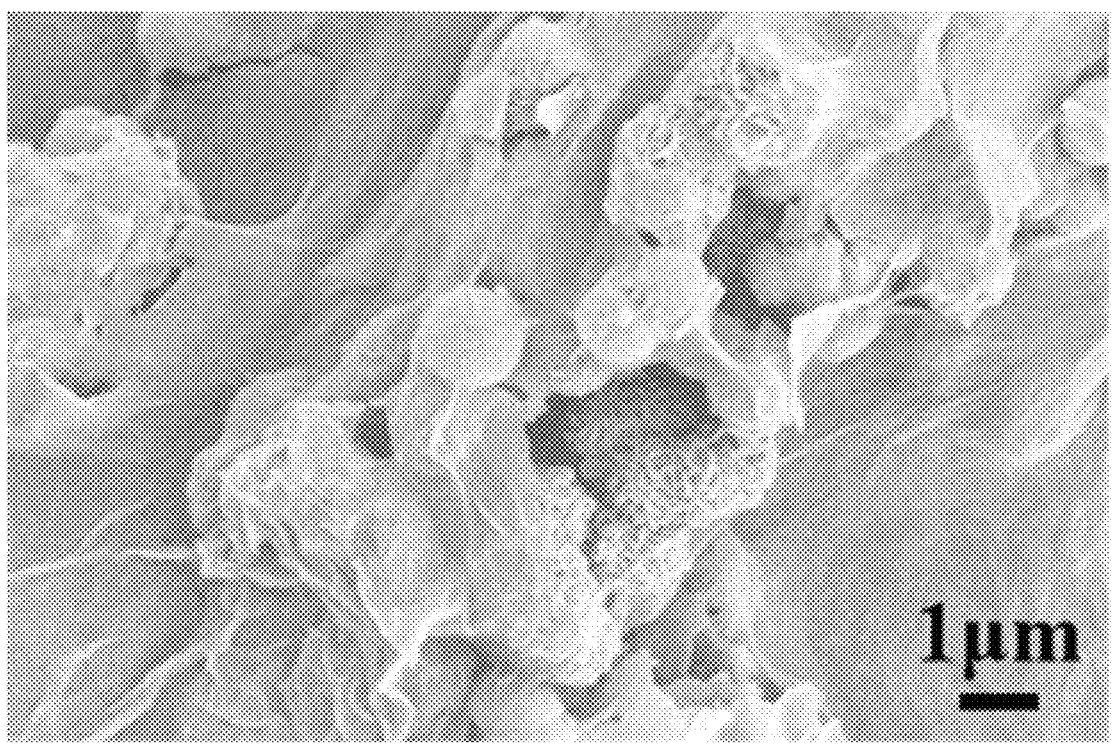
FIG. 2 shows an SEM pattern of CoS/rGO composite.

0.01 g of CoS nanoflowers (prepared in Example 3) was weighed and ultrasonically dispersed in 2 ml of anhydrous ethanol to form a dispersion of 5 mg/ml; 0.2 ml of GO aqueous solution with a concentration of 10 mg/ml was taken and ultrasonically dispersed in 50 ml of deionized water to form a 0.04 mg/ml GO solution; CoS was added dropwise dispersively into the GO solution under stirring state and then magnetically stirred for 3 hours. The solution was collected by centrifugation and the bottom precipitate was taken and dried in an oven at 60° C. to obtain the CoS/GO composite material; the obtained CoS/GO composite material was insulated in an oven at 200° C. for 2 hours to produce CoS/rGO composite material. The mass ratio of CoS to GO was 5:1, and it was named CoS/rGO-4. FIG. 2 shows an SEM pattern of CoS/rGO composite material and the graphite nanosheets can fully cover the surface of CoS nanoflowers.

With the above preparation method, the mass ratio of CoS to GO was adjusted to 1:5, 1:2, 2:1, 10:1, and 20:1. After reduction by annealing, CoS/rGO composite materials with different graphite contents were named CoS/rGO-1, CoS/rGO-2, CoS/rGO-3, CoS/rGO-5, and CoS/rGO-6, respectively.

Example 5 Preparation of Gas Sensor

The interdigital electrode of the gas sensor used in this experiment was manufactured based on silicon technology and traditional micromachining technology. The preparation process is as follows: The cleaned silicon wafer was placed in a prepared mixed solution of concentrated H₂SO₄ and H₂O₂, and treated at 90° C. for half an hour to obtain a surface hydrophilic silicon wafer substrate. After washing and drying, the surface was spin coated with photoresist, and a conventional interdigital photomask was placed for exposure and development. Then, gold was sputtered on the substrate, and finally, ultrasonic peeling was carried out for the photoresist was to obtain the interdigital electrode. The interdigital electrode was prepared with a spacing of 10 microns, a width of 10 microns, and a length of 600 microns.

Figure 3:
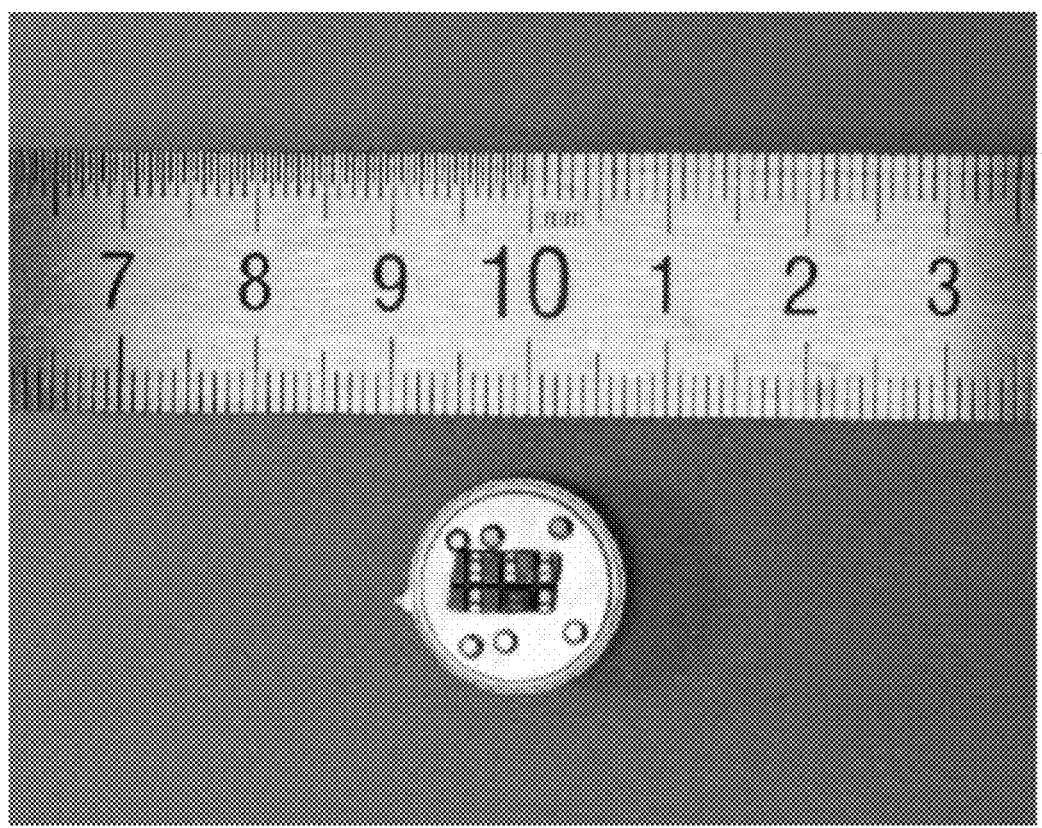
FIG. 3 shows the physical image of the sensor with the composite material.

The prepared interdigital electrode was washed with acetone and deionized water several times, fixed on a metal base with glue, and the two ends of the interdigital electrode were connected to the metal base with gold wire. The prepared CoS/rGO composite material was dispersed in an ethanol solution and prepared as a 0.1 mg/ml solution. A micropipette was used to take 2 microliters of the solution and evenly drop it onto the interdigital electrode, which was dried in an oven for later use. The physical picture is shown in FIG. 3.

The methods of using other materials as gas sensitive layers to prepare the device are the same as this, except for the replacement of gas sensitive materials.

0.1 mg/ml aqueous solution of GO was taken, and 2 microliters of the solution were uniformly dropped onto the interdigital electrode with a micropipette. It was annealed in an annealing furnace at 250° C. for 2 hours to obtain the rGO sensor component.

Example 6 Testing System for Gas Sensor

The testing system for gas sensor was completed through a conventional gas path. The entire testing system consisted of dry compressed air, the gas to be tested, a gas pipe, a flow controller, a switch, a gas mixing chamber, a testing chamber, a filter, and an Agilent semiconductor device analyzer. The testing system had two gas paths that can pass through the testing chamber, namely the background gas and the test gas. The background gas was dry compressed air, and the test gas was diluted with NO₂ and dry compressed air. The background gas and the test gas can alternately pass through the testing chamber through the adjustment of the switch. During testing, the gas concentration can be adjusted through a flow controller to prepare the required test gas concentration. The calculation formula for NO₂ gas concentration $C_N$ is:

$$C_N = \frac{1000 \times F_N}{F_N + F_A}.$$

Wherein, the concentration of $NO_2$ gas coming out of the $NO_2$ gas cylinder is 1000 ppm, $F_N$ (sccm) is the flow rate of $NO_2$ gas, and $F_A$ (slm) is the flow rate of compressed air used to dilute $NO_2$ gas.

The gas sensing test was conducted at room temperature and was completed by the Agilent B1500A semiconductor device analyzer in conjunction with the testing gas circuit system. When testing, the voltage was set to 5 mV. Before starting the test, air was introduced to stabilize the system. The I-V mode of the semiconductor analyzer was used to determine whether the device was conducting, and the initial resistance $R_0$ of the device was calculated accordingly.

Figure 4:
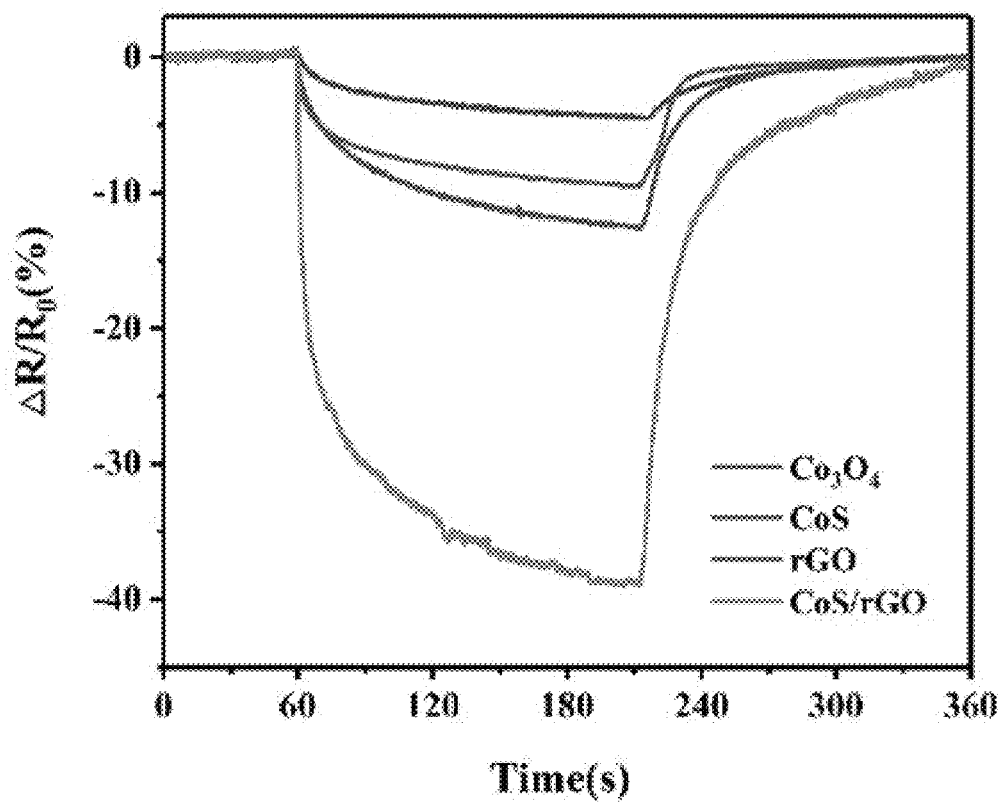
FIG. 4 shows the performance comparison tests of $Co_3O_4$, CoS, rGO, and CoS/rGO.

FIG. 4 shows the performance comparison tests of $Co_3O_4$, CoS, rGO, and CoS/rGO. The prepared $Co_3O_4$, CoS, rGO or CoS/rGO composite materials were added dropwise onto the interdigital electrode to obtain a gas sensor. At room temperature, the gas sensitivity tests were conducted on $Co_3O_4$, CoS, rGO, and CoS/rGO composite gas sensors with a concentration of 1 ppm $NO_2$. As shown in FIG. 4, the response and recovery time of the device are both 150 s. From the figure, it can be seen that $Co_3O_4$, CoS, rGO, and CoS/rGO composite material all exhibit p-type response characteristic in the oxidizing gas $NO_2$ and the response values of $Co_3O_4$, CoS, rGO, and CoS/rGO composite gas sensors were 4.5%, 9.5%, 12.7%, and 39.7%, respectively, indicating good response values, which indicates that $Co_3O_4$, CoS, and rGO have the potential to be used as sensitive materials for detecting $NO_2$ gas, while the response of CoS/rGO composite material is greatly increased, which ensures that CoS/rGO composite material can be used as a gas sensitive material for detecting $NO_2$ gas, and the response characteristic curve of the device can be recovered to the initial value, indicating its good recoverability.

Figure 5:
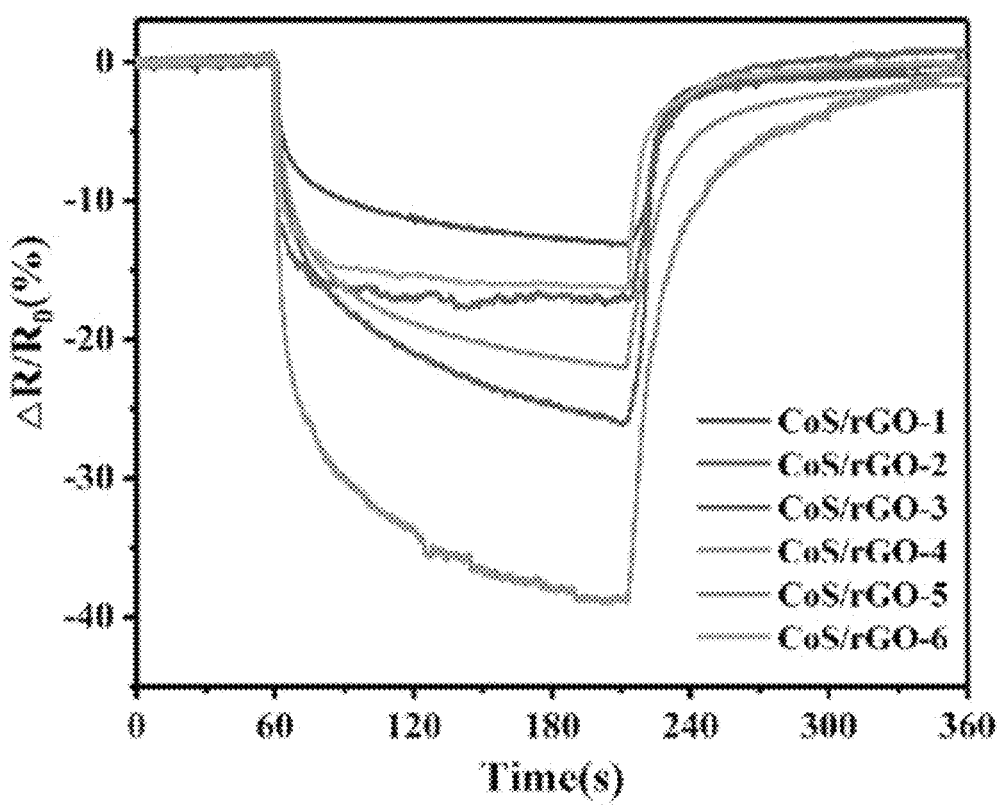
FIG. 5 shows the performance testing of CoS/rGO composite materials with different graphite contents: CoS/rGO-1, CoS/rGO-2, CoS/rGO-3, CoS/rGO-4, CoS/rGO-5, and CoS/rGO-6.

In order to investigate the effect of additive amount of graphite on the gas sensing performance of CoS/rGO composite material, composite materials with a mass ratio of CoS to GO of 1:5, 1:2, 2:1, 5:1, 10:1, and 20:1 were prepared, respectively. After reduction by high-temperature annealing, CoS/rGO composite materials with different graphite contents were named CoS/rGO-1, CoS/rGO-2, CoS/rGO-3, CoS/rGO-5, and CoS/rGO-6, respectively, and the corresponding gas sensing characteristics were studied. The resistances from CoS/rGO-1 to CoS/rGO-6 were 2.4 KΩ, 4.2 KΩ, 5.5 KΩ, 6.5 KΩ, 8.5 KΩ, and 12.0 KΩ, respectively. The gas sensing performance of CoS/rGO-1 to CoS/rGO-6 with different graphite contents was tested at a concentration of 1 ppm of $NO_2$. As shown in FIG. 5, the gas sensing responses of devices CoS/rGO-1, CoS/rGO-2, CoS/rGO-3, CoS/rGO-4, CoS/rGO-5, and CoS/rGO-6 were 13.2%, 17.3%, 26.1%, 39.7%, 22.0%, and 16.2%, respectively. And it can be seen that when the mass ratio of CoS to GO was 5:1, the CoS/rGO composite material had the highest gas sensing response to 1 ppm of $NO_2$, reaching 39.7%. When the content of graphite was too high, the overall response of CoS/rGO composite material was lower. Graphite reduced the specific surface area of the composite material and reduced the effective gas adsorption sites, thus affecting the gas sensing performance.

Figure 6:
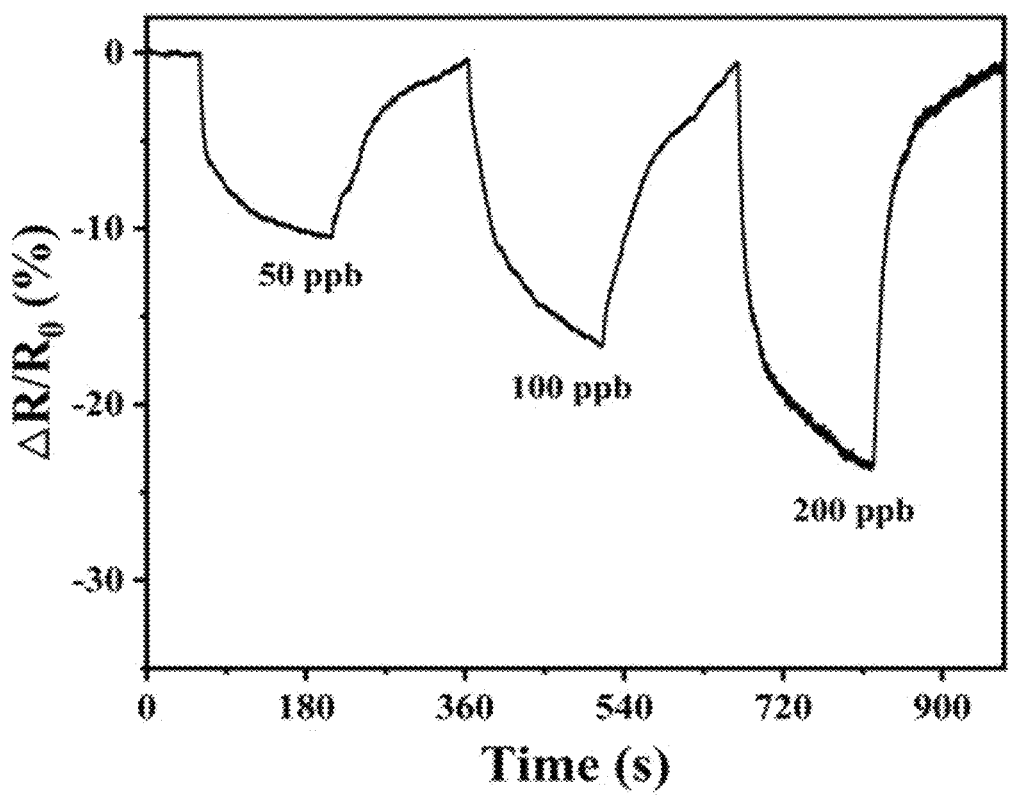
FIG. 6 shows the gas sensing response curves of the CoS/rGO-4 composite material sensor to different concentrations of $NO_2$.

Nanocomposite materials not only possess the physical and chemical properties of a single material, but also may exhibit more outstanding properties than the single material due to the synergistic effects between materials. The present invention solved the problem that the composition of transition metal sulfides with other materials in the prior art changes the conductivity of the composite material, thereby affecting the gas sensing performance. When the mass ratio of CoS to GO was 5:1, CoS/rGO-4 composite material had good gas sensing performance. In order to better test the gas sensitivity response performance of CoS/rGO composite material, the gas sensitivity tests were conducted for CoS/rGO-4 composite material at different concentrations of $NO_2$. As shown in FIG. 6, with the increase of $NO_2$ concentration, the response of CoS/rGO-4 composite gas sensor also increased. The sensor's response to 50 ppb, 100 ppb, and 200 ppb of $NO_2$ gas was 10.5%, 16.7%, and 23.6%, respectively. It can be seen that the CoS/rGO-4 composite gas sensor still exhibited good response recovery characteristic at a lower concentration of $NO_2$ at 50 ppb, indicating that the sensor had a lower detection limit.

The present invention mainly uses the hydrothermal method to prepare the glycerol cobalt precursor, prepares $Co(OH)_2$ nanoflowers under alkaline conditions, obtains the $Co_3O_4$ nanoflowers after high-temperature annealing, uses sodium sulfide nonahydrate for ion exchange to prepare the CoS nanoflowers and adds different contents of graphite to prepare the CoS/rGO composite material through high-temperature annealing. SEM was used to make characterization observation of the surface morphology and structure of the composite material and FTIR, Raman, XRD, and XPS were used for the composition and crystal phase characterization of the composite material to demonstrate the successful preparation of CoS/rGO heterostructure. The CoS/rGO composite materials with different contents of graphite were added to a solution for ultrasonic dispersion, and added dropwise on the interdigital electrode to prepare a gas sensor, which was used to tested for gas sensitivity with $NO_2$ gas. And the results showed that the CoS/rGO composite gas sensor had good response to $NO_2$ gas, as well as excellent stability, repeatability, and selectivity. The specific results are as follows: (1) Cobalt nitrate hexahydrate was used as raw material to prepare the glycerol cobalt precursor by the hydrothermal method, prepares $Co_3O_4$ nanoflowers by alkaline conditions and high-temperature annealing, uses the ion exchange to prepare the CoS nanoflowers and adds different contents of graphite to change the ratio of CoS to GO to prepare the CoS/rGO composite materials with different ratios, which were further used to prepare the CoS/rGO composite material gas sensors with different graphite contents.

(2) The gas sensitivity test results for $NO_2$ gas showed that when the ratio of CoS to GO was 5:1, the CoS/rGO composite material had the highest response value to 1 ppm $NO_2$ gas, reaching 39.7%; Compared with the response values of pure graphite and CoS, the response value of CoS/rGO composite material was greatly improved.

(3) The CoS/rGO composite material gas sensor was subjected to gas sensitivity testing on different concentrations of $NO_2$ gas. The results showed that the composite material sensor had a response value of 62.6% to 100 ppm high concentration of $NO_2$ gas. At a lower concentration of 50 ppb $NO_2$, it still had good response recovery characteristics, indicating that the sensor had a lower detection limit.

Air pollution has become a thorny issue that must be faced in the process of rapid socio-economic development. As one of the sources of air pollution, $NO_2$ mainly comes from automobile exhaust and industrial chemical combustion, so the monitoring of $NO_2$ is crucial. So, it is particularly important to develop a highly sensitive and reusable gas sensor. Graphite and transition metal sulfide form composite materials that can form heterostructures at the interface. The composition of the two materials can effectively prevent the stacking and aggregation of graphite sheets, increase the

The invention claimed is:

1. A method for preparing a cobalt sulfide/reduced graphite oxide composite, comprising:
   mixing a water-soluble cobalt salt, a small molecule alcohol solvent, and glycerin to prepare a glycerol cobalt precursor;
   mixing the glycerol cobalt precursor with an alkaline solution to prepare $Co(OH)_2$ nanoflowers;
   calcining the $Co(OH)_2$ nanoflowers to obtain $Co_3O_4$ nanoflowers;
   reacting the $Co_3O_4$ nanoflowers with a water-soluble sulfur salt to obtain CoS nanoflowers;
   adding the CoS nanoflowers to ethanol to obtain a CoS nanoflower dispersion;
   mixing the CoS nanoflower dispersion with a graphite oxide dispersion;
   conducting a centrifugation treatment to obtain a precipitate; and
   heating the precipitate at 150-250° C. for 60-120 minutes to obtain the cobalt sulfide/reduced graphite oxide composite,
   wherein the cobalt sulfide/reduced graphite oxide composite comprises the CoS nanoflowers and a graphite covered on the CoS nanoflowers; and
   wherein the graphite is a reduced graphite oxide.

2. The method for preparing the cobalt sulfide/reduced graphite oxide composite according claim 1, wherein a mass ratio of the CoS nanoflowers to the graphite oxide is 0.2-20:1.

3. The method for preparing the cobalt sulfide/reduced graphite oxide composite according to claim 2, wherein the mass ratio of the CoS nanoflowers to the graphite oxide is 2-10:1.

* * * * *